United States Patent
Fujimura et al.

(10) Patent No.: US 11,491,853 B2
(45) Date of Patent: Nov. 8, 2022

(54) SUNROOF DEVICE

(71) Applicant: AISIN CORPORATION, Kariya (JP)

(72) Inventors: Takuya Fujimura, Kariya (JP); Akinori Osamura, Kariya (JP)

(73) Assignee: Aisin Corporation, Aichi (JP)

( * ) Notice: Subject to any disclaimer, the term of this patent is extended or adjusted under 35 U.S.C. 154(b) by 0 days.

(21) Appl. No.: 17/202,763

(22) Filed: Mar. 16, 2021

(65) Prior Publication Data

US 2021/0339610 A1 Nov. 4, 2021

(30) Foreign Application Priority Data

Apr. 30, 2020 (JP) ................ JP2020-080229

(51) Int. Cl.
*B60J 7/04* (2006.01)
*B60J 7/043* (2006.01)

(52) U.S. Cl.
CPC .................. *B60J 7/0435* (2013.01)

(58) Field of Classification Search
CPC . B60J 7/024; B60J 7/0435; B60J 7/047; B60J 7/057; B60J 7/0573; B60J 7/1856; B60J 7/192
USPC ............ 296/221, 216.02–216.5, 220.01
See application file for complete search history.

(56) References Cited

U.S. PATENT DOCUMENTS

| 5,516,187 A * | 5/1996 | Zani | B60J 7/192 296/223 |
| 8,398,162 B2 * | 3/2013 | Katsura | B60J 7/024 296/216.03 |
| 2007/0145786 A1 * | 6/2007 | MacNee, III | B60J 7/047 296/220.01 |

FOREIGN PATENT DOCUMENTS

| EP | 663310 A1 * | 7/1995 | ............... B60J 7/05 |
| JP | 3636791 B2 * | 4/2005 | |
| JP | 2018-127079 A | 8/2018 | |

* cited by examiner

*Primary Examiner* — Dennis H Redder
(74) *Attorney, Agent, or Firm* — Finnegan, Henderson, Farabow, Garrett & Dunner, LLP

(57) ABSTRACT

A sunroof device includes a rear link that slides along a longitudinal direction of a guide rail in conjunction with a slide member and moves up and down a rear end side of a movable panel by tilting in conjunction with the sliding of the slide member. Further, the rear link is provided with an engaging protrusion protruding in a width direction of the guide rail, and the guide rail is provided with a link engaging portion that regulates, by arranging the engaging protrusion inside, tilting of the rear link in a rising direction. The link engaging portion includes an upwardly opened cutout portion provided in the guide rail, and a metallic engaging bracket having an upper wall portion covering a topside of the cutout portion by being fixed to the guide rail. The engaging protrusion includes a metallic shaft body, and a resin layer covering the shaft body.

6 Claims, 10 Drawing Sheets

SUNROOF DEVICE

CROSS REFERENCE TO RELATED APPLICATIONS

This application is based on and claims priority under 35 U.S.C. § 119 to Japanese Patent Application 2020-080229, filed on Apr. 30, 2020, the entire content of which is incorporated herein by reference.

TECHNICAL FIELD

This disclosure generally relates to a sunroof device.

BACKGROUND DISCUSSION

A conventional sunroof device of a vehicle includes a guide rail extending in a vehicle front-rear direction, a slide member that slides along a longitudinal direction of the guide rail, and a support member that causes a movable panel supported above to perform an opening and closing action, based on an action of the slide member.

For example, a sunroof device described in JP2018-127079A (Reference 1) includes, as a support member thereof, a rear link having a configuration as a tilting link that slides in conjunction with a slide member, and moves up and down a rear end side of the movable panel by tilting in conjunction with sliding of the slide member. Accordingly, the sunroof device has a configuration that causes the movable panel to perform a tilt action.

In the sunroof device having such a configuration, there is a possibility that, even when the movable panel is in a state of being drawn down by inclination of the tilting link, the tilting link tilts in a rising direction due to input of external force, and the movable panel is brought upward.

In view of this, in the sunroof device of the conventional technique described above, the tilting link is provided with an engaging protrusion protruding in a width direction of the guide rail, and the guide rail is provided with a link engaging portion that regulates, by arranging the engaging protrusion inside, the tilting in a direction in which the tilting link rises. Accordingly, the movable panel is configured to keep a state of being drawn down by tilting of the tilting link.

Conventionally, in formation of such a link engaging portion, a guide block having a guide groove which the tilting link moves into and moves apart from, based on an opening and closing action of the movable panel involving actuation of the tilting link, is generally configured to be fixed to the guide rail. Using a resin for a material of such a guide block can ensure satisfactory silence in addition to ease of molding of the resin.

However, stability or reliability is one of the most important issues in a vehicle including the sunroof device. In a configuration in which the link engaging portion is formed by use of the resinous guide block as in the conventional technique described above, the actual situation is that it is difficult to achieve a more stable keeping state of the tilting link, thus leaving room for improvement in this respect.

A need thus exists for a sunroof device which is not susceptible to the drawback mentioned above.

SUMMARY

A sunroof device includes a movable panel, a guide rail, a slide member, and a support member. The movable panel is provided in a roof opening of a vehicle. The guide rail extends in a vehicle front-rear direction. The slide member slides along a longitudinal direction of the guide rail. The support member causes the movable panel supported above the guide rail to perform an opening and closing action, based on an action of the slide member. The support member has a tilting link that slides along the longitudinal direction of the guide rail in conjunction with the slide member, and moves up and down a rear end side of the movable panel by tilting in conjunction with sliding of the slide member. The tilting link is provided with an engaging protrusion protruding in a width direction of the guide rail, and the guide rail is provided with a link engaging portion that regulates, by arranging the engaging protrusion inside, the tilting in a direction in which the tilting link rises. The link engaging portion includes an upwardly opened cutout portion provided in the guide rail, and a metallic engaging bracket having an upper wall portion covering a topside of the cutout portion by being fixed to the guide rail. The engaging protrusion includes a metallic shaft body, and a resin layer covering the shaft body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, one embodiment of a sunroof device is described with reference to the drawings.

Figure 1:
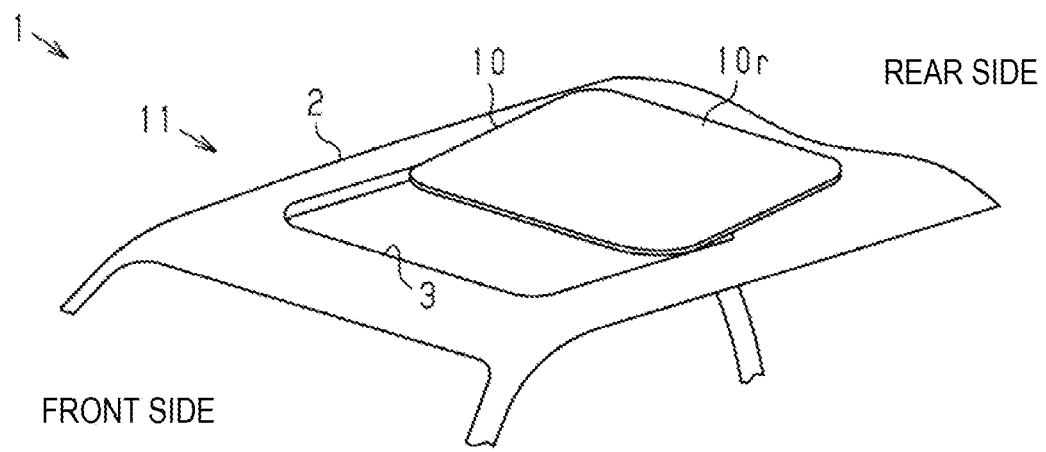
FIG. 1 is a perspective view of a vehicle including a sunroof device.
Figure 2:
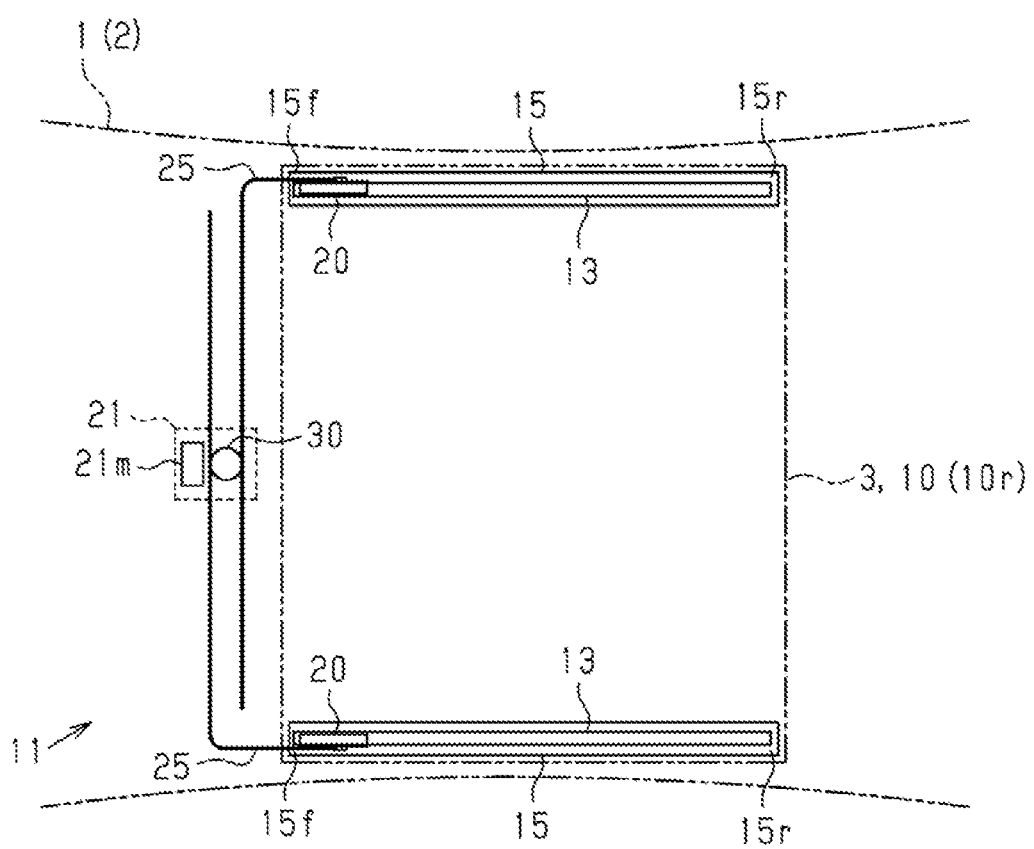
FIG. 2 is a schematic configuration view of the sunroof device.

As illustrated in FIGS. 1 and 2, a roof opening 3 formed in a roof panel 2 of a vehicle 1 is provided with a substantially flat-plate-shaped movable panel 10 that can open and close the roof opening 3. The vehicle 1 according to the present embodiment is provided with a sunroof device 11 that can cause the movable panel 10 to perform an opening and closing action by motor driving.

To describe in detail, as illustrated in FIG. 2, the sunroof device 11 according to the present embodiment includes a pair of left and right support members 13 and 13 that support the movable panel 10 in the roof opening 3. The sunroof device 11 includes guide rails 15 and 15 extending in a vehicle front-rear direction on both end sides in a width direction of the roof opening 3. Further, the sunroof device 11 includes a pair of left and right slide members 20 and 20 sliding along a longitudinal direction of each of the guide rails 15 and 15 in a state of being coupled to each of the support members 13 and 13. The sunroof device 11 according to the present embodiment has a configuration in which the movable panel 10 performs an opening and closing action due to sliding of each of the slide members 20 and 20.

The sunroof device 11 according to the present embodiment includes an actuator 21 with a motor 21m as a drive source. In the sunroof device 11 according to the present embodiment, the actuator 21 is fixed to an inner side of the roof opening 3 at a vehicle front position of the roof panel 2. Furthermore, the sunroof device 11 according to the present embodiment includes a pair of drive cables 25 and 25 routed along the left and right guide rails 15 and 15 of the sunroof device 11. Note that the actuator 21 according to the present embodiment has a drive gear 30 with which the respective drive cables 25 and 25 mesh at two positions across a rotation axis of the actuator 21. The sunroof device 11 according to the present embodiment has a configuration in which the slide members 20 and 20 slide in a vehicle front-rear direction, based on drive force of the actuator 21 transmitted via the drive cables 25 and 25.

Note that, in the sunroof device 11 according to the present embodiment, the support members 13, the guide rails 15, and the slide members 20 each have left and right pair configurations. Thus, one of the left and right configurations is described in each of the drawings referred to below.

Figure 3A:
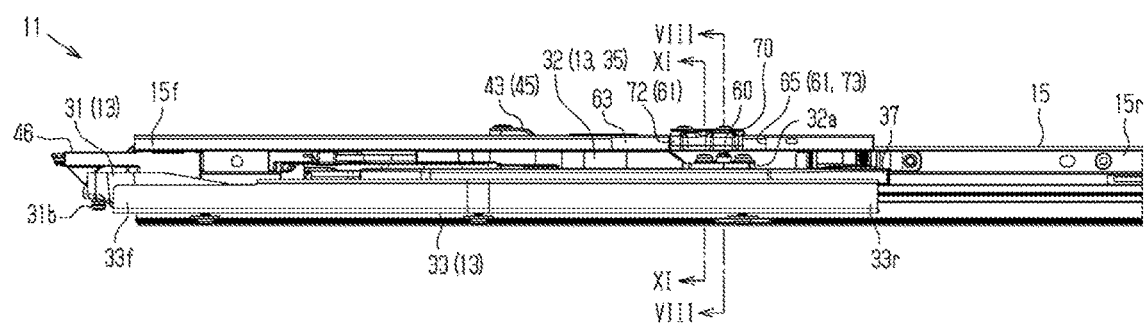
FIG. 3(a) is a plan view of the sunroof device.
Figure 4A:
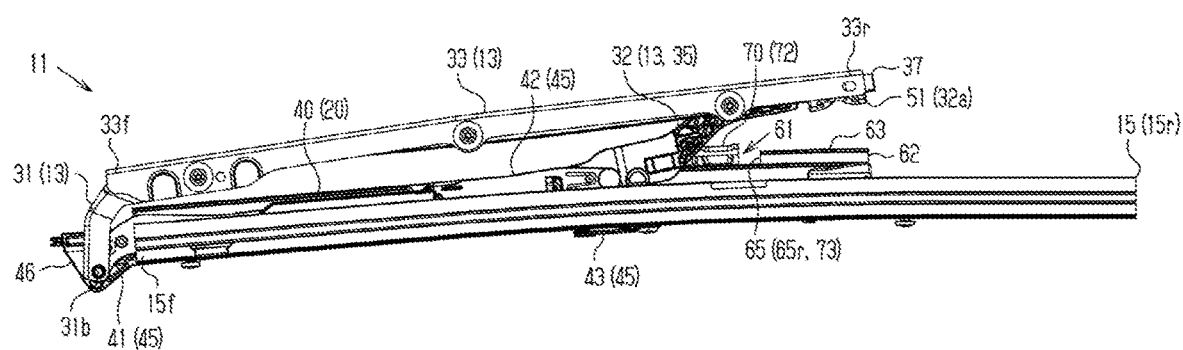
FIGS. 4(a) and (b) are side views of the sunroof device.
Figure 5:
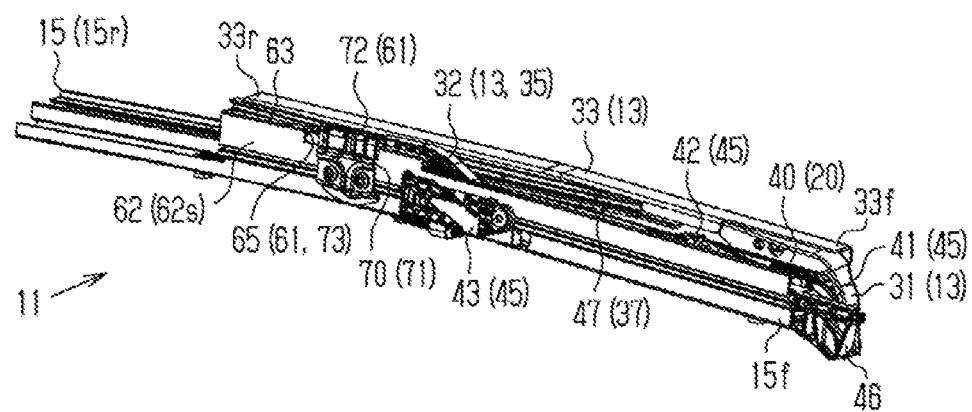
FIG. 5 is a perspective view of the sunroof device.
Figure 6:
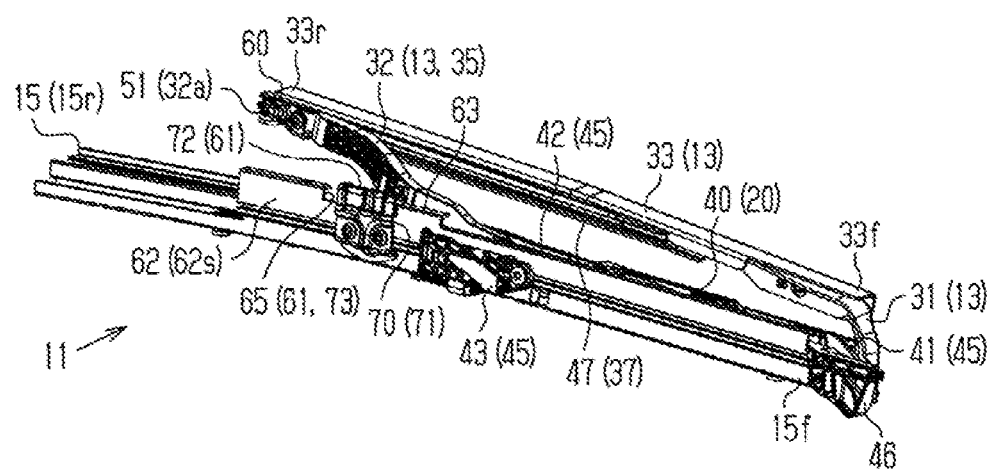
FIG. 6 is a perspective view of the sunroof device.
Figure 7:
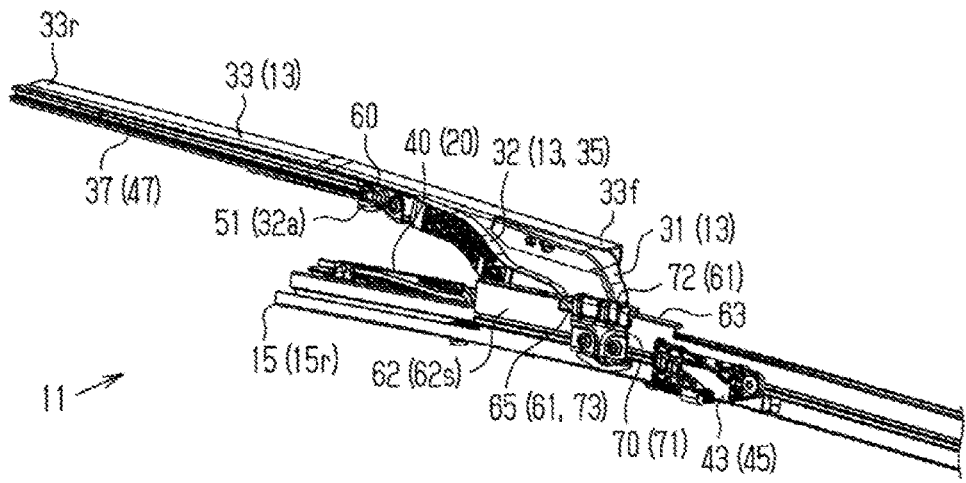
FIG. 7 is a perspective view of the sunroof device.

To describe in further detail, as illustrated in FIGS. 3(a) and (b), FIGS. 4(a) and (b), and FIGS. 5 to 7, the sunroof device 11 according to the present embodiment includes a front link 31 and a rear link 32 coupled to the guide rail 15, and a panel bracket 33 supported by the front link 31 and the rear link 32.

In the sunroof device 11 according to the present embodiment, the front link 31 and the rear link 32 are each slidably coupled to the guide rail 15. The front link 31 and the rear link 32 are coupled, at positions apart from each other, to the panel bracket 33 extending in the vehicle front-rear direction (a left-right direction in FIGS. 3 and 4). Specifically, the rear link 32 slides over the guide rail 15 at a position closer to a rear end 15r of the guide rail 15 than the front link 31. Further, the movable panel 10 is fixed to the panel bracket 33 extending in the longitudinal direction of the guide rail 15, and thereby supported above the guide rail 15. Accordingly, in the sunroof device 11 according to the present embodiment, the support member 13 of the movable panel 10 is formed by the front link 31, the rear link 32, and the panel bracket 33.

To describe in detail, in the sunroof device 11 according to the present embodiment, the front link 31 is fixed to a front end 33f of the panel bracket 33. The front link 31 according to the present embodiment has a configuration in which a lower end 31b protruding downward from the front end 33f of the panel bracket 33 is slidably coupled to the guide rail 15.

In the sunroof device 11 according to the present embodiment, the rear link 32 is coupled to the guide rail 15 in a state where a proximal end of the rear link 32 is slidable. Further, the rear link 32 has a distal end 32a side thereof extending toward a vehicle rear side (the right side in FIGS. 3 and 4). The rear link 32 according to the present embodiment has a configuration as a tilting link 35 that supports the panel bracket 33 in a state of being capable of tilting with a proximal end side coupled to the guide rail 15 as a supporting point.

Specifically, as illustrated in FIGS. 5 to 7, the panel bracket 33 according to the present embodiment includes, at a side end thereof, a guide portion 37 extending in a longitudinal direction of the panel bracket 33. The rear link 32 according to the present embodiment is coupled in a state where the distal end 32a thereof is in a state of being rotatable and slidable relative to the guide portion 37.

In other words, as illustrated in FIGS. 3 to 7, in the sunroof device 11 according to the present embodiment, the rear link 32 supports the panel bracket 33 in a state where a coupling position of the distal end 32a to the panel bracket 33 is changeable along the longitudinal direction of the panel bracket 33. Further, the rear link 32 according to the present embodiment tilts with the proximal end thereof as a supporting point, and thereby moves a coupling position between the rear link 32 and the panel bracket 33, i.e., a coupling position of the distal end 32a to the panel bracket 33. Accordingly, the sunroof device 11 according to the present embodiment has a configuration in which the movable panel 10 supported above the panel bracket 33 performs a slide action and a tilt action.

To describe in further detail, the sunroof device 11 according to the present embodiment includes a drive shoe 40 as the slide member 20 that slides in a vehicle front-rear direction along an extending direction of the guide rail 15 by being coupled to the drive cable 25. The sunroof device 11 also includes check members 41 and 42 that slide over the guide rail 15 together with the front link 31 and the rear link 32 in a state of being coupled to the front link 31 and the rear link 32. Further, in the sunroof device 11 according to the present embodiment, the check members 41 and 42 form a check mechanism 45 together with a check block provided in the guide rail 15. The sunroof device 11 according to the present embodiment has a configuration in which the front link 31 and the rear link 32 slide over the guide rail 15 in a vehicle front-rear direction in conjunction with the drive shoe 40 that slides over the guide rail 15, based on an action of the check mechanism 45, and the rear link 32 tilts.

Figure 3B:
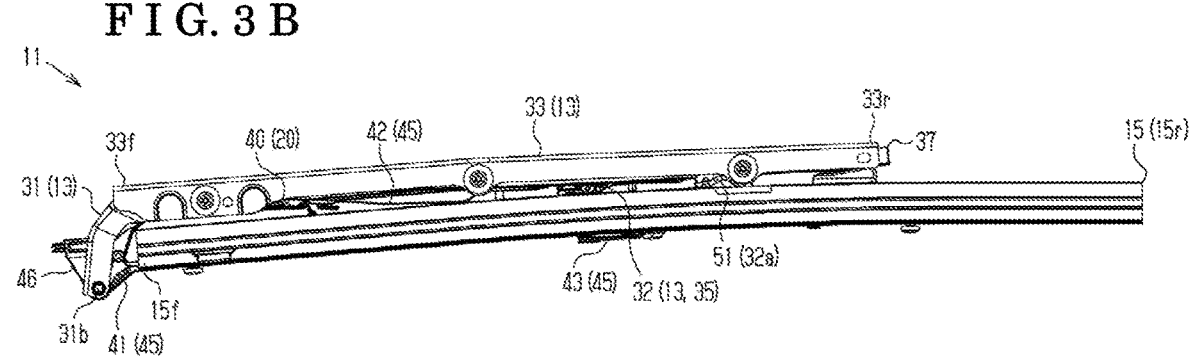
FIG. 3(b) is a side view of the sunroof device.

Specifically, as illustrated in FIGS. 3 and 5, in the sunroof device 11 according to the present embodiment, when the drive shoe 40 is in a state of being located in the vicinity of a front end 15f of the guide rail 15, the panel bracket 33 supported by the front link 31 and the rear link 32 is arranged substantially parallel to the guide rail 15. Accordingly, the sunroof device 11 according to the present embodiment is configured in such a way that the movable panel 10 supported by the panel bracket 33 is in a fully closed state of blocking the roof opening 3.

As illustrated in FIGS. 4(a) and 6, in the sunroof device 11 according to the present embodiment, the drive shoe 40 slides to the vehicle rear side from such a fully closed state, and thereby the rear link 32 first tilts in a rising direction (a counterclockwise direction in FIGS. 3 and 4). Consequently, in the sunroof device 11 according to the present embodiment, the movable panel 10 supported by the panel bracket 33 tilts up. In other words, the movable panel 10 is configured to perform an opening action in such a way that a rear end 10r thereof is brought up.

Figure 4B:
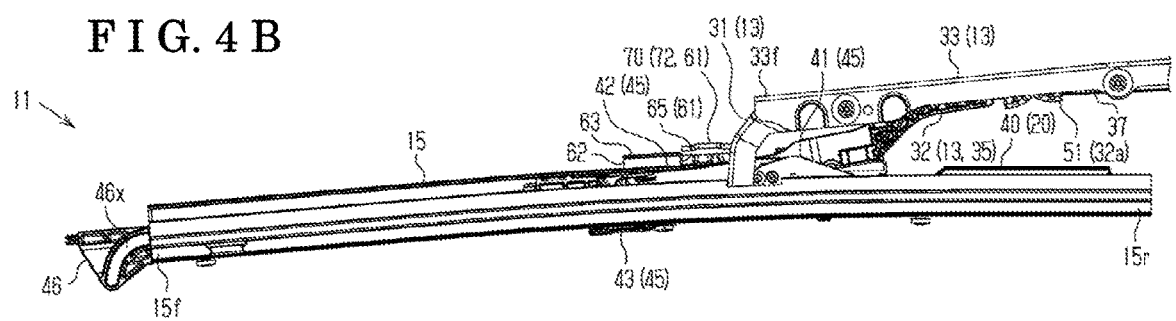

Furthermore, as illustrated in FIGS. 4(b) and 7, in the sunroof device 11 according to the present embodiment, the drive shoe 40 further slides to the vehicle rear side from this state, and thereby the front link 31 and the rear link 32 that support the panel bracket 33 slide to the vehicle rear side. Specifically, at this moment, the front link 31 slides to the vehicle rear side in such a way as to move close to the rear link 32 located behind the front link 31. Further, based on a relative position change of the front link 31 to the rear link 32, a coupling position of the rear link 32 to the panel bracket 33 moves to the front end 33f side in the longitudinal direction of the panel bracket 33. Accordingly, the sunroof device 11 according to the present embodiment has a configuration in which the movable panel 10 supported by the panel bracket 33 performs an action of sliding and opening to the vehicle rear side in a state of tilting up as described above.

Note that, in the sunroof device 11 according to the present embodiment, a terminal member 46 provided in the front end 15f of the guide rail 15 forms a curving guide portion 46x extending upward from a vehicle front side toward a rear side. The sunroof device 11 according to the present embodiment has a configuration in which the movable panel 10 performs an action of sliding and opening from a fully closed state in such a way that the front link 31 slides along the curving guide portion 46x.

In other words, in the sunroof device 11 according to the present embodiment, the front link 31 slides from a vehicle front side toward a rear side along the curving guide portion 46x, and thereby the movable panel 10 supported by the front link 31 is brought upward. Accordingly, the movable panel 10 has a configuration that does not interfere with the roof panel 2.

In the sunroof device 11 according to the present embodiment, in a state where the movable panel 10 performs a sliding and opening action in this way, the drive shoe 40 slides from a vehicle rear side to a front side, and thereby the front link 31 and the rear link 32 that support the panel bracket 33 also slide to the vehicle front side. Further, at this moment, the front link 31 moves apart from the rear link 32 to the vehicle front side, and thereby, based on this relative position change, a coupling position of the rear link 32 to the panel bracket 33 moves to a rear end 33r side in the longitudinal direction of the panel bracket 33. Accordingly, the sunroof device 11 according to the present embodiment has a configuration in which the movable panel 10 supported by the panel bracket 33 performs a sliding and closing action.

Furthermore, in the sunroof device 11 according to the present embodiment, the drive shoe 40 thereof slides from this state from a vehicle rear side to a front side, and thereby the rear link 32 tilts in an inclining direction (a clockwise direction in FIGS. 3 and 4). Accordingly, in the sunroof device 11 according to the present embodiment, the movable panel 10 supported by the panel bracket 33 tilts down. In other words, the movable panel 10 is configured to perform a closing action in such a way as to draw down the rear end 10r side.

Figure 8:
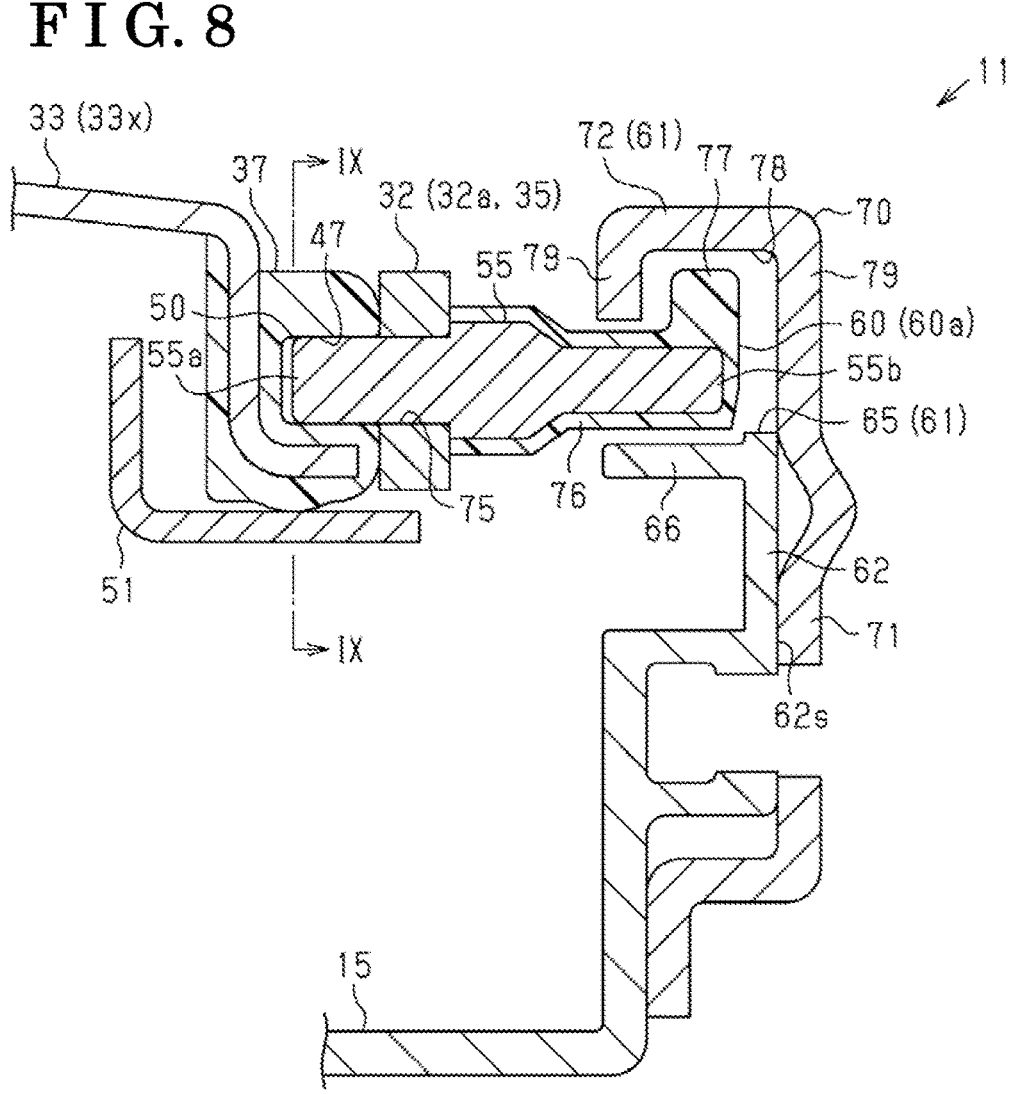
FIG. 8 is a perspective view of the sunroof device.
Figure 9:
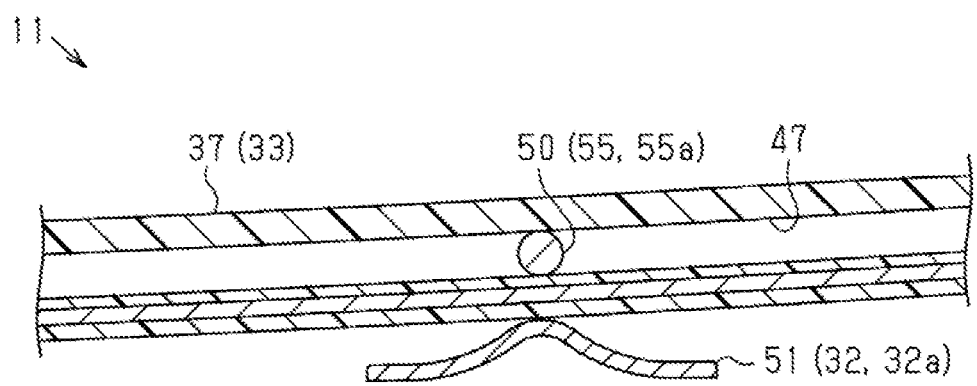
FIG. 9 is a perspective view of the sunroof device.

To describe in further detail, as illustrated in FIGS. 8 and 9, the panel bracket 33 according to the present embodiment includes a guide groove 47 provided in the guide portion 37 of the panel bracket 33 and extending in a longitudinal direction in a state of being open to an outer side (a right side in FIG. 9) of a width direction of the panel bracket 33. The distal end 32a of the rear link 32 is provided with a shaft-shaped engaging protrusion 50 that is inserted into the guide groove 47. Accordingly, the sunroof device 11 according to the present embodiment has a configuration in which the distal end 32a of the rear link 32 engages with the guide portion 37 of the panel bracket 33 in a state of being slidable along a longitudinal direction of the guide portion 37 and rotatable.

Figure 10:
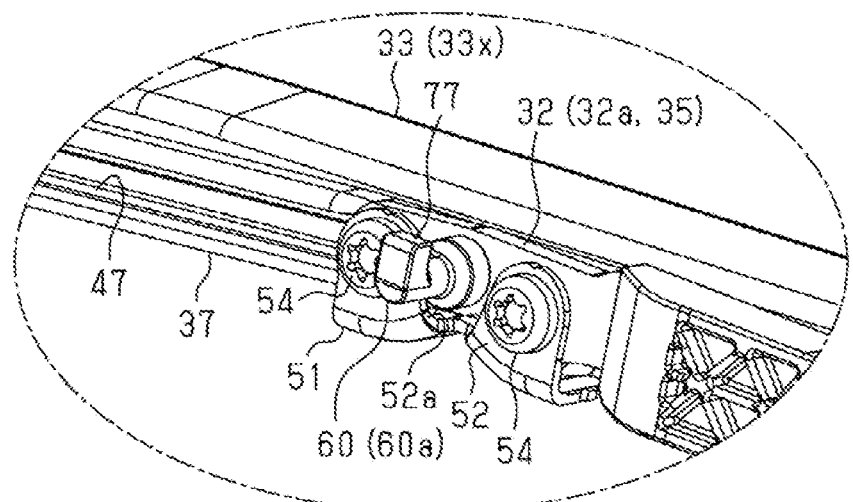
FIG. 10 is a perspective view of the vicinity of a coupling portion of a rear link to a panel bracket.
Figure 11:
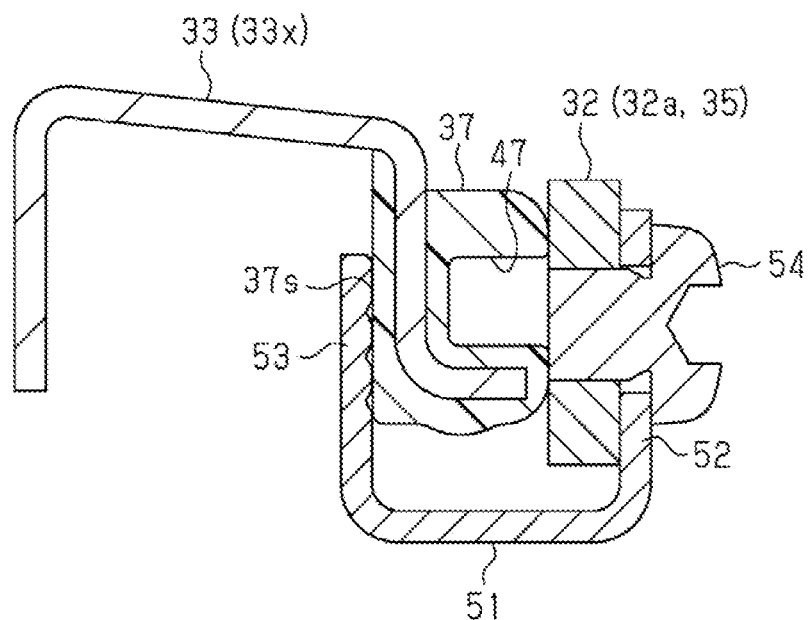
FIG. 11 is a sectional view of the vicinity of the coupling portion of the rear link to the panel bracket.

As illustrated in FIGS. 10 and 11, the sunroof device 11 according to the present embodiment includes a slide bracket 51 that is substantially C-shaped in section and that catches the guide portion 37 of the panel bracket 33 and the distal end 32a of the rear link 32 in a width direction (a left-right direction in FIG. 9) of the panel bracket 33. Accordingly, the sunroof device 11 according to the present embodiment has a configuration that stably keeps an engaging state of the guide portion 37 of the panel bracket 33 and the distal end 32a of the rear link 32.

Specifically, in the sunroof device 11 according to the present embodiment, the guide portion 37 of the panel bracket 33 has a long and substantially square-rod-like outer shape. Note that the guide portion 37 according to the present embodiment is molded integrally with a main body portion 33x of the panel bracket 33 made of a metal by using resin. In the sunroof device 11 according to the present embodiment, the distal end 32a of the rear link 32 has a substantially flat-plate-shaped outer shape being rectangular in section. The slide bracket 51 according to the present embodiment is configured to be assembled to the guide portion 37 of the panel bracket 33 and the distal end 32a of the rear link 32 from a lower side thereof.

Furthermore, in the slide bracket 51 according to the present embodiment, a side wall portion 52 that is one of a pair of side wall portions 52 and 53 facing each other is fastened to the distal end 32a of the rear link 32. Note that, in the sunroof device 11 according to the present embodiment, screw members 54 and 54 are screwed to the distal end 32a of the rear link 32 at two positions apart from each other in a longitudinal direction of the rear link 32. Accordingly, the slide bracket 51 according to the present embodiment is configured to catch the guide portion 37 of the panel bracket 33 and the distal end 32a of the rear link 32 between these side wall portions 52 and 53 in a state where the side wall portion 53 on the other side slides in contact with a side surface 37s of the guide portion 37 of the panel bracket 33.

As illustrated in FIGS. 8 and 10, in the sunroof device 11 according to the present embodiment, the engaging protrusion 50 on the rear link 32 side that is inserted into the guide groove 47 on the panel bracket 33 side of the sunroof device 11 is formed by penetrating a shaft body 55 through the distal end 32a of the rear link 32 having a substantially flat-plate-shaped outer shape.

In other words, in the sunroof device 11 according to the present embodiment, a first end 55a side (a left end in FIG. 8) of the shaft body 55 penetrated through the distal end 32a of the rear link 32 constitutes the engaging protrusion 50 for the guide groove 47 provided in the guide portion 37 of the panel bracket 33.

Furthermore, the guide rail 15 according to the present embodiment is provided with a link engaging portion 61 inside which an engaging protrusion 60 is arranged in such a way that a second end 55b side (a right end in FIG. 8) of the shaft body 55 penetrated through the distal end 32a of the rear link 32 serves as the engaging protrusion 60, when the movable panel 10 supported by the panel bracket 33 is in a fully closed state. Note that the side wall portion 52 of the slide bracket 51 is provided with a cutout portion 52a inside which the engaging protrusion 60 is arranged.

Accordingly, the sunroof device 11 according to the present embodiment regulates upward movement of the distal end 32a of the rear link 32 provided with the engaging protrusion 60. In other words, the sunroof device 11 according to the present embodiment has a configuration that stably keeps a support position of the movable panel 10 in a fully closed state thereof by regulating tilting of the rear link 32 in a rising direction.

To describe in detail, as illustrated in FIGS. 8 and 12 to 14, the guide rail 15 according to the present embodiment includes a vertical wall portion 62 rising at a position where the rear link 32 is caught between the panel bracket 33 and the vertical wall portion 62 in a width direction (a left-right direction in FIG. 8 and an up-down direction in FIG. 14) of the guide rail 15 when the movable panel 10 is in a fully closed state. An upper end (an end on an upper side in FIG. 13) of the vertical wall portion 62 is provided with a flange portion 63 extending in a longitudinal direction (a left-right direction in FIGS. 13 and 14) of the guide rail 15 in a state of protruding to the panel bracket 33 side (a lower side in FIG. 14) in a width direction of the guide rail 15. Further, the guide rail 15 according to the present embodiment has an upwardly opened cutout portion 65 provided along a longitudinal direction of the guide rail 15 in such a way as to cut out upper ends of the flange portion 63 and the vertical wall portion 62. The sunroof device 11 according to the present embodiment has a configuration in which when the movable panel 10 is in a fully closed state, the above-described engaging protrusion 60 provided at the distal end 32a of the rear link 32 is arranged at a position in a longitudinal direction of the guide rail 15 where the cutout portion 65 is provided.

Furthermore, the guide rail 15 according to the present embodiment has an intermediate wall portion 66 extending under the flange portion 63 in a longitudinal direction of the guide rail 15 by protruding from the vertical wall portion 62 in a width direction of the guide rail 15. The sunroof device 11 according to the present embodiment has a configuration in which when the movable panel 10 is in a fully closed state, the above-described engaging protrusion 60 is arranged in the cutout portion 65 at a position in an up-down direction between the intermediate wall portion 66 and the flange portion 63.

The sunroof device 11 according to the present embodiment includes an engaging bracket 70 fixed to the vertical wall portion 62 at a position in a longitudinal direction of the guide rail 15 where the cutout portion 65 is provided. Accordingly, in the sunroof device 11 according to the present embodiment, the link engaging portion 61 inside which the engaging protrusion 60 provided at the distal end 32a of the rear link 32 is arranged when the movable panel 10 is in a fully closed state as described above is formed.

Specifically, the engaging bracket 70 according to the present embodiment has a fixed wall 71 fixed to the vertical wall portion 62 in a state of running along an outer wall surface 62s of the vertical wall portion 62, and an upper wall portion 72 extending in a longitudinal direction of the guide rail 15 in a state of covering a topside of the cutout portion 65 by protruding to the panel bracket 33 side from an upper end of the fixed wall 71. In the sunroof device 11 according to the present embodiment, a length L1 of the upper wall portion 72 of the engaging bracket 70 running along a longitudinal direction of the guide rail 15 is set to be shorter than a length L0 of the cutout portion 65 also running along a longitudinal direction of the guide rail 15 (L1<L0). Further, in the guide rail 15 according to the present embodiment, an upward opening 73 in which a topside of the cutout portion 65 is not covered with the upper wall portion 72 of the engaging bracket 70 is formed on a rear end 65r side of the cutout portion 65, based on a difference of length between the upper wall portion 72 of the engaging bracket 70 and the cutout portion 65. The sunroof device 11 according to the present embodiment has a configuration in which the engaging protrusion 60 of the rear link 32 moving based on an opening and closing action of the movable panel 10 moves into and moves apart from the link engaging portion 61 formed by the cutout portion 65 and the engaging bracket 70 via the upward opening 73.

Figure 14:
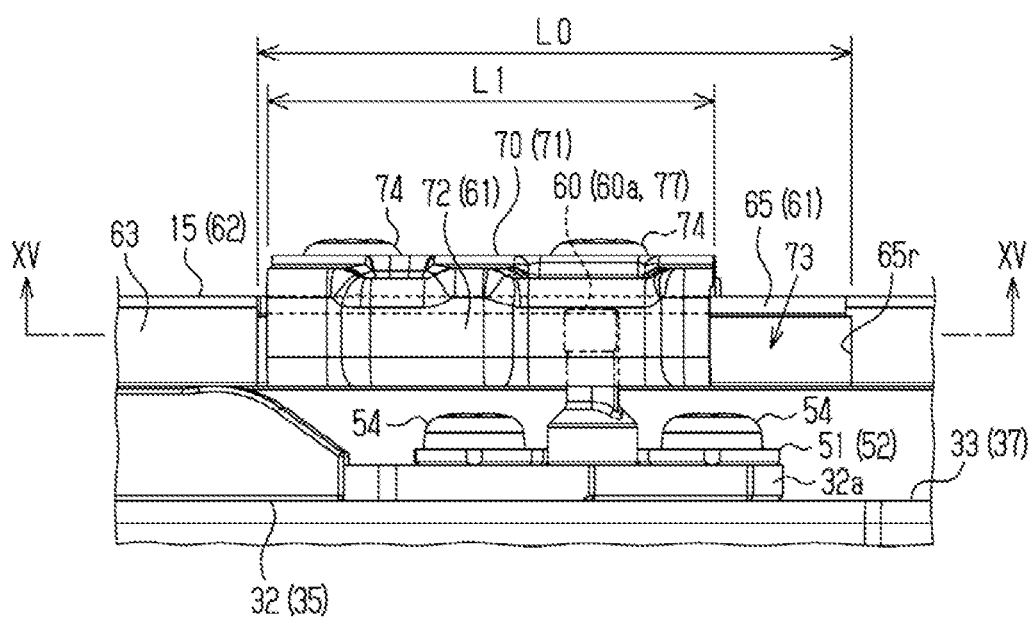
FIG. 14 is a plan view of the vicinity of the link engaging portion provided in the guide rail.
Figure 15:
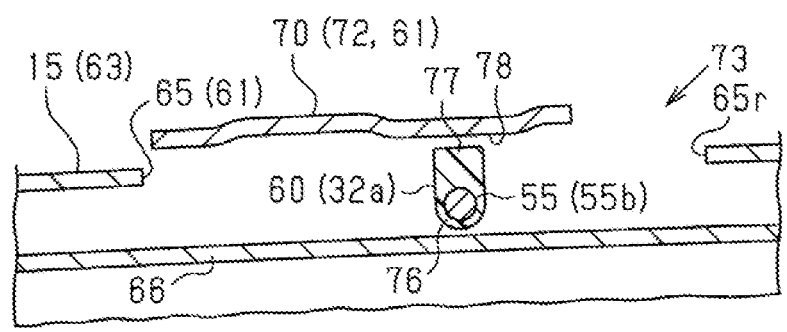
FIG. 15 is a sectional view of the vicinity of the link engaging portion provided in the guide rail.

In other words, as illustrated in FIGS. 14 and 15, the sunroof device 11 according to the present embodiment is configured in such a way that when the movable panel 10 is in a fully closed state, the engaging protrusion 60 provided at the distal end 32a of the rear link 32 is arranged below the upper wall portion 72 of the engaging bracket 70 fixed to the guide rail 15, based on an inclination angle of the rear link 32. Further, the sunroof device 11 according to the present embodiment is configured in such a way that at this moment, the engaging protrusion 60 provided at the distal end 32a of the rear link 32 is arranged at a position where the upper wall portion 72 of the engaging bracket 70 covers a topside of the cutout portion 65 in a longitudinal direction of the guide rail 15, based on a slide position of the rear link 32. Accordingly, the sunroof device 11 according to the present embodiment has a configuration in which when the movable panel 10 is in a fully closed state, the engaging protrusion 60 provided at the distal end 32a of the rear link 32 is arranged inside the link engaging portion 61 formed by the cutout portion 65 of the guide rail 15 and the upper wall portion 72 of the engaging bracket 70.

Figure 16:
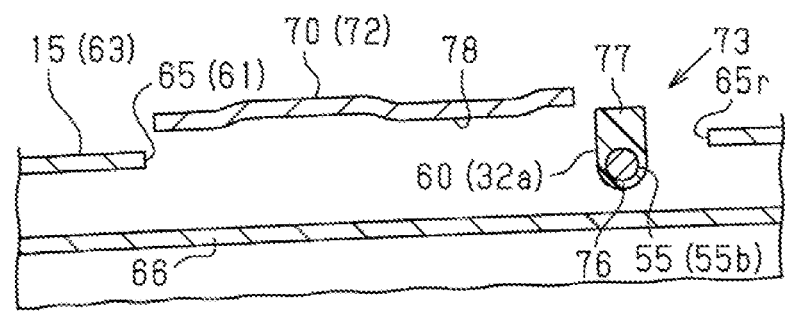
FIG. 16 is a sectional view of the vicinity of the link engaging portion provided in the guide rail.
Figure 17:
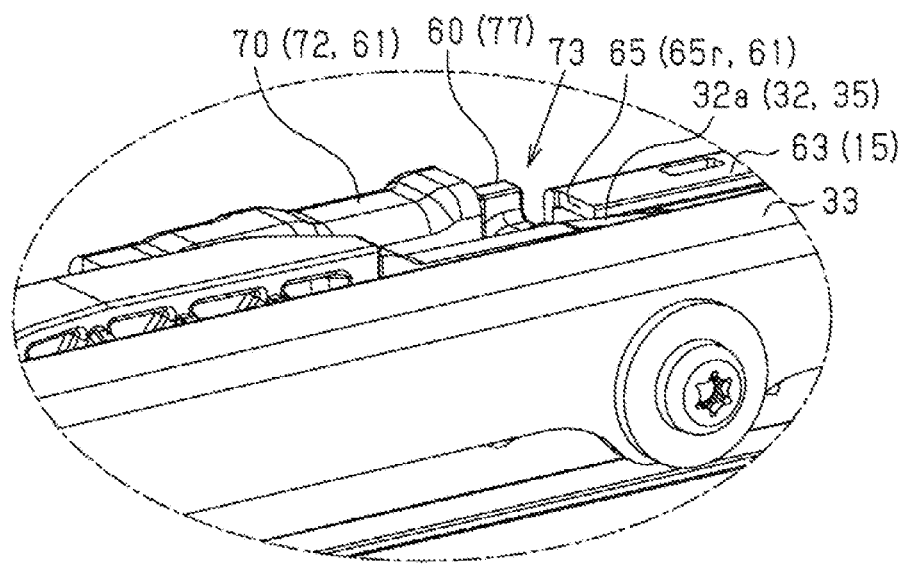
FIG. 17 is a perspective view of the vicinity of the link engaging portion provided in the guide rail.
Figure 18:
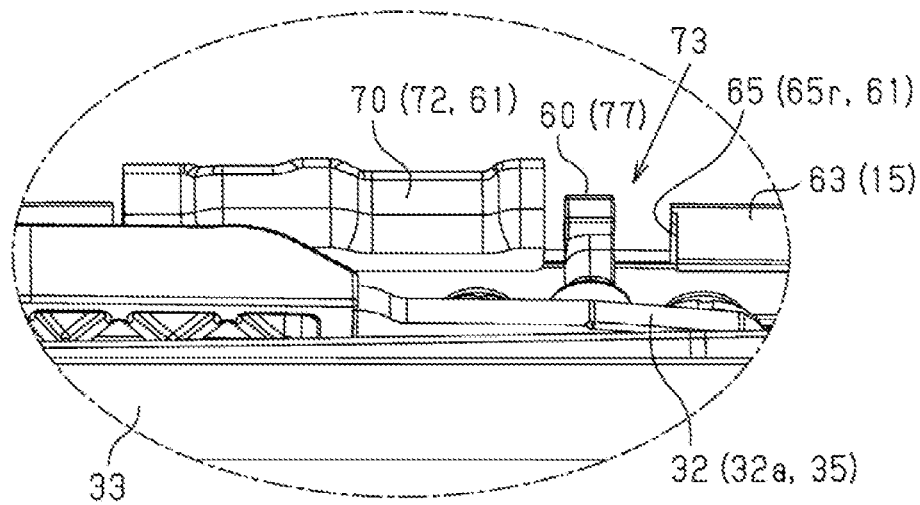
FIG. 18 is a perspective view of the vicinity of the link engaging portion provided in the guide rail.

As illustrated in FIGS. 16 to 18, the sunroof device 11 according to the present embodiment is configured in such a way that the rear link 32 slides toward a vehicle rear side without substantially tilting while the drive shoe 40 slides toward a vehicle rear side in a predetermined section from a position in the vicinity of the front end 15f of the guide rail 15 where the movable panel 10 is in a fully closed state as described above. In the sunroof device 11 according to the present embodiment, the engaging protrusion 60 arranged inside the link engaging portion 61 reaches the upward opening 73 formed on the rear end 65r side of the cutout portion 65 as a result of the sliding of the rear link 32.

Furthermore, in the sunroof device 11 according to the present embodiment, the rear link 32 tilts from this state in a rising direction in conjunction with the drive shoe 40 that slides to a vehicle rear side of the sunroof device 11, and thereby the engaging protrusion 60 provided at the distal end 32a of the rear link 32 moves upward via the upward opening 73. Accordingly, the sunroof device 11 according to the present embodiment has a configuration in which the engaging protrusion 60 provided at the distal end 32a of the rear link 32 moves apart from the link engaging portion 61 provided in the guide rail 15.

The sunroof device 11 according to the present embodiment is configured in such a way that the rear link 32 inclines due to a tilting and closing action of the movable panel 10, and thereby the engaging protrusion 60 provided at the distal end 32a of the rear link 32 moves downward at a position in a longitudinal direction of the guide rail 15 being associated with the rear end 65r of the cutout portion 65. Further, in the sunroof device 11 according to the present embodiment, due to inclination of the rear link 32, the engaging protrusion 60 that has moved into the cutout portion 65 via the upward opening 73 set at the rear end 65r moves in the cutout portion 65 to a vehicle front side, i.e., a position where a topside is covered with the upper wall portion 72 of the engaging bracket 70, based on the sliding of the rear link 32 toward a vehicle front side. Accordingly, the sunroof device 11 according to the present embodiment has a configuration in which when the movable panel 10 is in a fully closed state, the engaging protrusion 60 provided at the distal end 32*a* of the rear link 32 is arranged inside the link engaging portion 61 provided in the guide rail 15.

Figure 12:
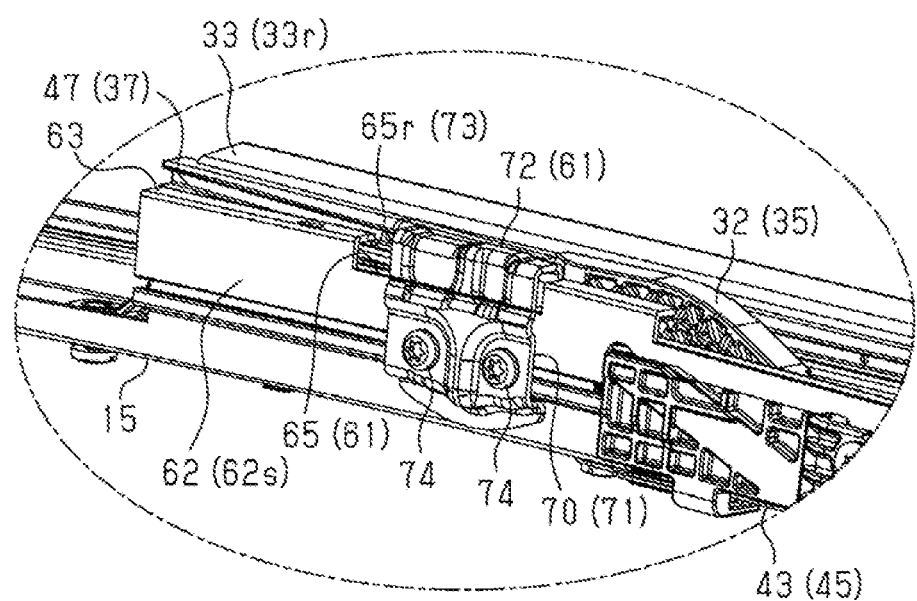
FIG. 12 is a perspective view of the vicinity of a link engaging portion provided in a guide rail.
Figure 13:
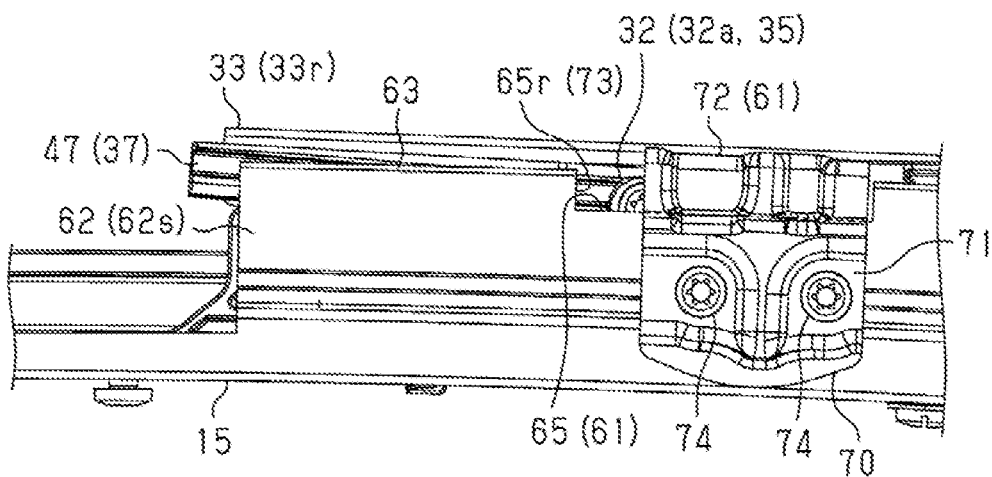
FIG. 13 is a side view of the vicinity of the link engaging portion provided in the guide rail.

To describe in further detail, in the sunroof device 11 according to the present embodiment, the guide rail 15 is formed by use of an aluminum alloy. The engaging bracket 70 is formed by use of an iron-base metal. Note that the fixed wall 71 and the upper wall portion 72 of the engaging bracket 70 are integrally formed by plastic working. As illustrated in FIGS. 12 to 14, the sunroof device 11 according to the present embodiment has a configuration in which the fixed wall 71 of the engaging bracket 70 is fixed to the vertical wall portion 62 of the guide rail 15 by fastening using a screw member 74.

As illustrated in FIG. 8, in the sunroof device 11 according to the present embodiment, the shaft body 55 in which the first end 55*a* side thereof forms the engaging protrusion 50 for the guide groove 47 of the panel bracket 33 by being penetrated through the distal end 32*a* of the rear link 32 is made by use of a metal. In the sunroof device 11 according to the present embodiment, the engaging protrusion 60 for the link engaging portion 61 is formed by performing resin molding working with the second end 55*b* side of the shaft body 55 as an insert.

In other words, in the sunroof device 11 according to the present embodiment, the shaft body 55 is fitted into the distal end 32*a* of the rear link 32 in such a way that the first end 55*a* side constituting the engaging protrusion 50 for the guide groove 47 is inserted into a through-hole 75 provided in the distal end 32*a* of the rear link 32 from a side (a right side in FIG. 8) opposite to a direction in which the panel bracket 33 is located. Accordingly, the sunroof device 11 according to the present embodiment has a configuration in which the second end 55*b* side of the shaft body 55 covered with a resin layer 76 functions as the engaging protrusion 60 for the link engaging portion 61 provided in the guide rail 15.

In the sunroof device 11 according to the present embodiment, the upper wall portion 72 of the engaging bracket 70 forms a downwardly open accommodating space 78 having a substantially C-shaped section in such a way that a tip part protruding on the panel bracket 33 side in a width direction (a left-right direction in FIG. 8) of the guide rail 15 is bent from the upper end of the fixed wall 71. Further, the engaging protrusion 60 according to the present embodiment has, at a tip 60*a* thereof, an upwardly protruding upward protrusion 77. Note that, in the sunroof device 11 according to the present embodiment, the engaging protrusion 60 is formed integrally with the resin layer 76 by resin molding working with the second end 55*b* side of the shaft body 55 as an insert. The sunroof device 11 according to the present embodiment has a configuration in which the upward protrusion 77 is arranged inside the accommodating space 78 being a substantially C-shaped in section and formed by the upper wall portion 72 of the engaging bracket 70.

In other words, the link engaging portion 61 according to the present embodiment has a pair of side wall portions 79 and 79 between which the upward protrusion 77 provided in the engaging protrusion 60 on the rear link 32 side is caught in a width direction of the guide rail 15. Accordingly, the sunroof device 11 according to the present embodiment is capable of more stably keeping a support position of the movable panel 10 in a fully closed state thereof.

Next, operation of the present embodiment is described.

In the sunroof device 11 according to the present embodiment, when the movable panel 10 is in a fully closed state, the engaging protrusion 60 provided at the distal end 32*a* of the rear link 32 is arranged inside the link engaging portion 61 provided in the guide rail 15. Accordingly, upward movement of the engaging protrusion 60 is regulated, and thereby the rear link 32 having a configuration as the tilting link 35 is kept in an inclined state.

Next, effects of the present embodiment are described.

(1) The sunroof device 11 includes the movable panel 10 provided in the roof opening 3 of the vehicle 1, the guide rail 15 extending in a vehicle front-rear direction, the drive shoe 40 as the slide member 20 that slides along a longitudinal direction of the guide rail 15, and the support member 13 that causes the movable panel 10 to perform an opening and closing action, based on an action of the drive shoe 40. The sunroof device 11 also includes, as the support member 13 thereof, the rear link 32 having a configuration as the tilting link 35 that slides along a longitudinal direction of the guide rail 15 in conjunction with the drive shoe 40 and moves up and down the rear end 10*r* of the movable panel 10 by tilting in conjunction with the sliding of the drive shoe 40. Further, the rear link 32 is provided with the engaging protrusion 60 protruding in a width direction of the guide rail 15, and the guide rail 15 is provided with the link engaging portion 61 that regulates, by arranging the engaging protrusion 60 inside, tilting of the rear link 32 in a rising direction. The link engaging portion 61 includes the upwardly opened cutout portion 65 provided in the guide rail 15, and the metallic engaging bracket 70 having the upper wall portion 72 covering a topside of the cutout portion 65 by being fixed to the guide rail 15. The engaging protrusion 60 includes the metallic shaft body 55, and the resin layer 76 covering the shaft body 55.

According to the configuration described above, the engaging protrusion 60 arranged inside the cutout portion 65 constituting the link engaging portion 61 engages with the upper wall portion 72 of the engaging bracket 70 located above, and thereby tilting of the rear link 32 in a rising direction is regulated. Further, high engaging strength can be ensured by using a metal in the shaft body 55 and the engaging bracket 70 constituting the engaging protrusion 60. This can more stably keep the rear link 32 in an inclined state even when the rear link 32 is to be tilted by input of external force.

The engaging bracket 70 can be easily formed by plastic working or the like. Further, the shaft body 55 constituting the engaging protrusion 60 is covered with the resin layer 76, and thereby noise of contact with the upper wall portion 72 of the engaging bracket 70 can be suppressed. This can ensure ease of the molding and satisfactory silence.

(2) The guide rail 15 is made by use of an aluminum alloy. The engaging bracket 70 is made by use of an iron-base metal.

In other words, using an aluminum alloy for the guide rail 15 can ensure ease of the molding including the cutout portion 65. Using an iron-base metal for the engaging bracket 70 can ensure high engaging strength, while ensuring ease of the molding of the engaging bracket 70.

(3) The length L1 of the upper wall portion 72 of the engaging bracket 70 running along a longitudinal direction of the guide rail 15 is set to be shorter than the length L0 of the cutout portion 65 also running along a longitudinal direction of the guide rail 15 (L1<L0).

According to the configuration described above, the upward opening 73 in which a topside of the cutout portion 65 is not covered with the upper wall portion 72 of the engaging bracket 70 can be formed at a longitudinal end of the cutout portion 65, based on a difference of length between the upper wall portion 72 of the engaging bracket 70 and the cutout portion 65. The engaging protrusion 60 of the rear link 32 moving based on an opening and closing action of the movable panel 10 can be moved into and moved apart from the link engaging portion 61 formed by the cutout portion 65 and the engaging bracket 70 via the upward opening 73. As a result, a smooth opening and closing action of the movable panel 10 can be guaranteed with a simple configuration.

(4) The engaging protrusion 60 is provided with the upwardly protruding upward protrusion 77.

According to the configuration described above, a distance between the engaging protrusion 60 arranged in the link engaging portion 61 and the upper wall portion 72 of the engaging bracket 70 located above the engaging protrusion 60 can be narrowed. As a result, when the rear link 32 is to be tilted in a rising direction by input of external force, the upward protrusion 77 of the engaging protrusion 60 quickly abuts on the upper wall portion 72 of the engaging bracket 70, and tilting of the rear link 32 in a rising direction is suppressed. This can more stably keep the rear link 32 in an inclined state.

(5) The upward protrusion 77 is made by use of a resin.

According to the configuration described above, noise of contact with the upper wall portion 72 of the engaging bracket 70 can be suppressed, and impact during the abutment can be lessened. This can ensure satisfactory silence and high reliability. Further, the resin layer 76 of the engaging protrusion 60 covering the shaft body 55 can be molded integrally with the upward protrusion 77. This can ensure ease of the molding.

(6) The link engaging portion 61 has a pair of side wall portions 79 and 79 between which the upward protrusion 77 of the engaging protrusion 60 is caught in a width direction of the guide rail 15.

According to the configuration described above, the engaging protrusion 60 arranged in the link engaging portion 61 abuts on any of the side wall portions 79 and 79 located in a width direction of the guide rail 15, and thereby movement in the width direction is regulated. This can prevent the engaging protrusion 60 in the link engaging portion 61 from moving apart in a width direction of the guide rail 15 due to, for example, flexure or the like produced in the rear link 32. As a result, the rear link 32 can be more stably kept in an inclined state. In addition, looseness of the rear link 32 in a width direction of the guide rail 15 can be suppressed.

(7) The sunroof device 11 includes, as the support member 13 thereof, the panel bracket 33 to which the movable panel 10 is fixed in a state of extending in a longitudinal direction of the guide rail 15. Further, the panel bracket 33 is provided with the guide groove 47 extending in the longitudinal direction. By penetrating the shaft body 55 through the rear link 32, the second end 55b side constitutes the engaging protrusion 60 for the link engaging portion 61 in a state where the first end 55a side is inserted in the guide groove 47 of the panel bracket 33.

According to the configuration described above, the shaft body 55 of the engaging protrusion 60 functions as a coupling portion on the rear link 32 side that supports the panel bracket 33 while permitting relative movement of the rear link 32 in a longitudinal direction and relative rotation thereof. This can simplify a configuration. The resin layer 76 of the engaging protrusion 60 can also be easily formed by resin molding working with the second end 55b side of the shaft body 55 as an insert. Further, the first end 55a side can be easily fixed to the rear link 32 by, for example, insertion or the like of the first end 55a side into the through-hole 75 provided in the rear link 32. This can ensure satisfactory assemblability.

(8) The rear link 32 tilts with the proximal end coupled to the guide rail 15 as a supporting point. The engaging protrusion 60 is provided at the distal end 32a of the rear link 32. This can more stably keep the rear link 32 in an inclined state.

Note that the embodiment described above can be modified as follows and implemented. The embodiment described above and the following modification examples can be implemented in combination with each other within a technically consistent scope.

In the embodiment described above, the cutout portion 65 is upwardly opened in such a way as to cut out an upper end of the vertical wall portion 62 together with the flange portion 63 provided at the upper end of the vertical wall portion 62. However, without being limited to this, the flange portion 63 may be configured to be partly cut out without including the vertical wall portion 62.

In the embodiment described above, in the engaging bracket 70, the fixed wall 71 of the engaging bracket 70 is fixed to the vertical wall portion 62 of the guide rail 15 by fastening using the screw member 74. However, without being limited to this, a structure of fixing the engaging bracket 70 to the guide rail 15 may be modified to any structure such as welding. As long as the link engaging portion 61 is formable in such a way as to have the upper wall portion 72 covering a topside of the cutout portion 65, a shape of the link engaging portion 61 may also be modified to any shape.

In the embodiment described above, with regard to the upper wall portion 72 of the engaging bracket 70, the length L1 running along a longitudinal direction of the guide rail 15 is set to be shorter than the length L0 of the cutout portion 65 (L1<L0), and thereby the upward opening 73 in which a topside of the cutout portion 65 is not covered with the upper wall portion 72 is formed on the rear end 65r of the cutout portion 65. The engaging protrusion 60 of the rear link 32 moves into and moves apart from the link engaging portion 61 via the upward opening 73. However, without being limited to this, the engaging protrusion 60 may be configured to move into and move apart from the link engaging portion 61, for example, by partly cutting out the upper wall portion 72 of the engaging bracket 70. Holes through which the engaging protrusion 60 moves into and moves apart from the link engaging portion 61 may be configured to be separately formed in the guide rail 15.

Next, a technical concept that can be recognized from the embodiment and modification examples described above is described.

(A) The sunroof device, wherein the tilting link tilts with a proximal end coupled to the guide rail as a supporting point, and the engaging protrusion is provided at a distal end of the tilting link. This can more stably keep the tilting link in an inclined state.

A sunroof device includes a movable panel, a guide rail, a slide member, and a support member. The movable panel is provided in a roof opening of a vehicle. The guide rail extends in a vehicle front-rear direction. The slide member slides along a longitudinal direction of the guide rail. The support member causes the movable panel supported above the guide rail to perform an opening and closing action, based on an action of the slide member. The support member has a tilting link that slides along the longitudinal direction of the guide rail in conjunction with the slide member, and moves up and down a rear end side of the movable panel by tilting in conjunction with sliding of the slide member. The tilting link is provided with an engaging protrusion protruding in a width direction of the guide rail, and the guide rail is provided with a link engaging portion that regulates, by arranging the engaging protrusion inside, the tilting in a direction in which the tilting link rises. The link engaging portion includes an upwardly opened cutout portion provided in the guide rail, and a metallic engaging bracket having an upper wall portion covering a topside of the cutout portion by being fixed to the guide rail. The engaging protrusion includes a metallic shaft body, and a resin layer covering the shaft body.

According to the configuration described above, the engaging protrusion arranged inside the cutout portion constituting the link engaging portion engages with an upper wall portion of the engaging bracket located above, and thereby tilting of the tilting link in a rising direction is regulated. Further, high engaging strength can be ensured by using a metal in the shaft body and the engaging bracket constituting the engaging protrusion. This can more stably keep the tilting link in an inclined state even when the tilting link is to be tilted in the rising direction by input of external force.

The engaging bracket can be easily formed by plastic working or the like. Further, the shaft body constituting the engaging protrusion is covered with the resin layer, and thereby noise of contact with the upper wall portion of the engaging bracket can be suppressed. This can ensure ease of the molding and satisfactory silence.

In the sunroof device, the guide rail may be made by use of an aluminum alloy, and the engaging bracket may be made by use of an iron-base metal.

In other words, using an aluminum alloy for the guide rail can ensure ease of the molding including the cutout portion. Using an iron-base metal for the engaging bracket can ensure high engaging strength, while ensuring ease of the molding of the engaging bracket.

In the sunroof device, a length of the upper wall portion of the engaging bracket running along a longitudinal direction of the guide rail may be set to be shorter than a length of the cutout portion running along the longitudinal direction of the guide rail.

According to the configuration described above, an upward opening in which a topside of the cutout portion is not covered with the upper wall portion of the engaging bracket can be formed at a longitudinal end of the cutout portion, based on a difference of length between the upper wall portion of the engaging bracket and the cutout portion. The engaging protrusion of the tilting link moving based on an opening and closing action of the movable panel can be moved into and moved apart from the link engaging portion formed by the cutout portion and the engaging bracket via the upward opening. As a result, a smooth opening and closing action of the movable panel can be guaranteed with a simple configuration.

In the sunroof device, the engaging protrusion may be provided with an upwardly protruding upward protrusion.

According to the configuration described above, a distance between the engaging protrusion arranged in the link engaging portion and the upper wall portion of the engaging bracket located above the engaging protrusion can be narrowed. As a result, when the tilting link is to be tilted in a rising direction by input of external force, the upward protrusion of the engaging protrusion quickly abuts on the upper wall portion of the engaging bracket, and tilting of the tilting link in the rising direction is suppressed. This can more stably keep the tilting link in an inclined state.

In the sunroof device, the upward protrusion may be made by use of a resin.

According to the configuration described above, noise of contact with the upper wall portion of the engaging bracket can be suppressed, and impact during the abutment can be lessened. This can ensure satisfactory silence and high reliability. Further, the resin layer of the engaging protrusion covering the shaft body can be molded integrally with the upward protrusion. This can ensure ease of the molding.

In the sunroof device, the link engaging portion may have a pair of side wall portions between which the upward protrusion is caught in a width direction of the guide rail.

According to the configuration described above, the engaging protrusion arranged in the link engaging portion abuts on any of the side wall portions located in a width direction of the guide rail, and thereby movement in the width direction is regulated. This can prevent the engaging protrusion in the link engaging portion from moving apart in a width direction of the guide rail due to, for example, flexure or the like produced in the tilting link. As a result, the tilting link can be more stably kept in an inclined state. In addition, looseness of the tilting link in a width direction of the guide rail can be suppressed.

In the sunroof device, the support member may include a panel bracket to which the movable panel is fixed in a state of extending in a longitudinal direction of the guide rail, the panel bracket may be provided with a guide groove extending in a longitudinal direction of the panel bracket, and, by penetrating the shaft body through the tilting link, a second end side may constitute the engaging protrusion for the link engaging portion in a state where a first end side is inserted in the guide groove.

According to the configuration described above, the shaft body of the engaging protrusion functions as a coupling portion on the tilting link side that supports the panel bracket while permitting relative movement of the panel bracket in the longitudinal direction and relative rotation thereof. This can simplify a configuration. The resin layer of the engaging protrusion can also be easily formed by, for example, resin molding working or the like with the second end side of the shaft body as an insert. Further, the first end side can be easily fixed to the tilting link by, for example, insertion or the like of the first end side into a through-hole provided in the tilting link. This can ensure satisfactory assemblability.

According to this disclosure, the tilting link can be more stably kept in an inclined state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof device comprising:
a movable panel provided in a roof opening of a vehicle;
a guide rail extending in a vehicle front-rear direction;
a slide member that slides along a longitudinal direction of the guide rail; and
a support member that causes the movable panel supported above the guide rail to perform an opening and closing action, based on an action of the slide member, wherein
the support member has a tilting link that slides along the longitudinal direction of the guide rail in conjunction with the slide member, and moves up and down a rear end side of the movable panel by tilting in conjunction with sliding of the slide member,
the tilting link is provided with an engaging protrusion protruding in a width direction of the guide rail,
the guide rail is provided with a link engaging portion that regulates, by arranging the engaging protrusion inside, the tilting in a direction in which the tilting link rises,
the guide rail is made by use of an aluminum alloy;
the link engaging portion includes an upwardly opened cutout portion provided in the guide rail, and a metallic engaging bracket having an upper wall portion covering a topside of the cutout portion by being fixed to the guide rail,
the engaging bracket is made by use of an iron-base metal, and
the engaging protrusion includes a metallic shaft body and a resin layer covering the shaft body.

2. The sunroof device according to claim 1, wherein
a length of the upper wall portion of the engaging bracket running along a longitudinal direction of the guide rail is set to be shorter than a length of the cutout portion running along the longitudinal direction of the guide rail.

3. The sunroof device according to claim 1, wherein
the engaging protrusion is provided with an upwardly protruding upward protrusion.

4. The sunroof device according to claim 3, wherein
the upward protrusion is made by use of a comprises the resin.

5. The sunroof device according to claim 3, wherein A sunroof device comprising:
a movable panel provided in a roof opening of a vehicle;
a guide rail extending in a vehicle front-rear direction;
a slide member that slides along a longitudinal direction of the guide rail; and
a support member that causes the movable panel supported above the guide rail to perform an opening and closing action, based on an action of the slide member, wherein
the support member has a tilting link that slides along the longitudinal direction of the guide rail in conjunction with the slide member, and moves up and down a rear end side of the movable panel by tilting in conjunction with sliding of the slide member,
the tilting link is provided with an engaging protrusion protruding in a width direction of the guide rail,
the guide rail is provided with a link engaging portion that regulates, by arranging the engaging protrusion inside, the tilting in a direction in which the tilting link rises,
the link engaging portion includes an upwardly opened cutout portion provided in the guide rail, and a metallic engaging bracket having an upper wall portion covering a topside of the cutout portion by being fixed to the guide rail,
the engaging protrusion includes a metallic shaft body and a resin layer covering the shaft body,
the engaging protrusion is provided with an upwardly protruding upward protrusion,
the link engaging portion has a pair of side wall portions between which the upward protrusion is caught in a width direction of the guide rail.

6. A sunroof device comprising:
a movable panel provided in a roof opening of a vehicle;
a guide rail extending in a vehicle front-rear direction;
a slide member that slides along a longitudinal direction of the guide rail; and
a support member that causes the movable panel supported above the guide rail to perform an opening and closing action, based on an action of the slide member, wherein
the support member has a tilting link that slides along the longitudinal direction of the guide rail in conjunction with the slide member, and moves up and down a rear end side of the movable panel by tilting in conjunction with sliding of the slide member,
the support member includes a panel bracket to which the movable panel is fixed in a state of extending in a longitudinal direction of the guide rail,
the tilting link is provided with an engaging protrusion protruding in a width direction of the guide rail,
the guide rail is provided with a link engaging portion that regulates, by arranging the engaging protrusion inside, the tilting in a direction in which the tilting link rises,
the link engaging portion includes an upwardly opened cutout portion provided in the guide rail, and a metallic engaging bracket having an upper wall portion covering a topside of the cutout portion by being fixed to the guide rail,
the engaging protrusion includes a metallic shaft body and a resin layer covering the shaft body,
the panel bracket is provided with a guide groove extending in a longitudinal direction of the panel bracket, and,
by penetrating the shaft body through the tilting link, a second end side constitutes the engaging protrusion for the link engaging portion in a state where a first end side is inserted in the guide groove.

* * * * *